United States Patent
Chen et al.

(10) Patent No.: US 12,119,979 B2
(45) Date of Patent: Oct. 15, 2024

(54) APPARATUS AND METHOD FOR WIRELESS COMMUNICATION

(71) Applicant: BEIJING LEAPING LINE LINK TECHNOLOGY CO., LTD., Beijing (CN)

(72) Inventors: Jinhui Chen, Beijing (CN); Zhan Xu, Beijing (CN); Ruxin Zhi, Beijing (CN); Lu Tian, Beijing (CN)

(73) Assignee: BEIJING LEAPING LINE LINK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/557,290

(22) PCT Filed: Jun. 24, 2022

(86) PCT No.: PCT/CN2022/100945
§ 371 (c)(1),
(2) Date: Oct. 25, 2023

(87) PCT Pub. No.: WO2022/228587
PCT Pub. Date: Nov. 3, 2022

(65) Prior Publication Data
US 2024/0214255 A1    Jun. 27, 2024

(30) Foreign Application Priority Data
Apr. 26, 2021   (CN) .......................... 202110452250.9

(51) Int. Cl.
*H04L 27/26*     (2006.01)
*H04J 11/00*     (2006.01)
*H04L 1/00*      (2006.01)

(52) U.S. Cl.
CPC ...... *H04L 27/2691* (2013.01); *H04J 11/0036* (2013.01); *H04L 1/004* (2013.01); *H04L 27/2695* (2013.01)

(58) Field of Classification Search
CPC . H04L 27/2691; H04L 1/004; H04L 27/2695; H04J 11/0036
(Continued)

(56) References Cited

U.S. PATENT DOCUMENTS

2020/0186397 A1* 6/2020 Tsatsanis .......... H04L 25/03292
2020/0259692 A1   8/2020 Hadani
(Continued)

FOREIGN PATENT DOCUMENTS

CN    108283025 A    7/2018
CN    111628829 A    9/2020
(Continued)

OTHER PUBLICATIONS

International Search Report in the international application No. PCT/CN2022/100945, mailed on Aug. 29, 2022. 6 pages with English translation.
(Continued)

*Primary Examiner* — Emmanuel Bayard
(74) *Attorney, Agent, or Firm* — Syncoda LLC; Feng Ma

(57) ABSTRACT

An apparatus for wireless communication includes: a receiving unit, for receiving a first orthogonal time-frequency space symbol including multiple delay Doppler regions corresponding to multiple transmitting terminals; a processing unit, for executing the following steps: A1: dividing the multiple delay Doppler regions into multiple first-type sets according to different displacement intervals occupied in a first dimension, and performing iterative serial de-interference decoding on the multiple time-delay Doppler regions in a same first-class set; A2: dividing the multiple delay
(Continued)

Doppler regions into multiple second-type sets according to different displacement intervals occupied in a second dimension, and performing iterative serial de-interference decoding on the multiple time-delay Doppler regions in a same second-class set. The first dimension is one of a delay dimension and a Doppler dimension, and the second dimension is the other dimension of the two dimensions.

10 Claims, 9 Drawing Sheets

(58) Field of Classification Search
USPC .................................................. 375/260, 262
See application file for complete search history.

(56) References Cited

U.S. PATENT DOCUMENTS

| | | | |
|---|---|---|---|
| 2021/0250138 A1* | 8/2021 | Ibars Casas | ........ H04L 27/0008 |
| 2022/0385508 A1* | 12/2022 | Pfadler | ............. H04L 27/26532 |
| 2022/0393921 A1* | 12/2022 | Pfadler | ............... H04L 25/0224 |
| 2023/0224115 A1* | 7/2023 | Yuan | ........................ H04L 27/30 |
| | | | 370/329 |
| 2023/0388910 A1* | 11/2023 | Yuan | ..................... H04L 5/0005 |

FOREIGN PATENT DOCUMENTS

| | | |
|---|---|---|
| CN | 111786763 A | 10/2020 |
| CN | 111884975 A | 11/2020 |
| CN | 112003808 A | 11/2020 |
| CN | 113193935 A | 7/2021 |
| WO | 2020095101 A1 | 5/2020 |

OTHER PUBLICATIONS

Written Opinion of the International Search Authority in the international application No. PCT/CN2022/100945, mailed on Aug. 29, 2022. 8 pages with English translation.

Rasheed O K. etc. "Sparse Delay-Doppler Channel Estimation in Rapidly Time-Varying Channels for Multiuser OTFS on the Uplink", 2020 IEEE 91st Vehicular Technology Conference (VTC2020-Spring), Jun. 30, 2020, Sections II-IV. 5 pages.

Du Kunpeng et al., "Pilot design based on minimizing inter doppler interference for orthogonal time frequency space modulation", Information Technology 05, May 21, 2020. the whole document. 5 pages with English abstract.

Tian Lu et al., "Effect of passive intermodulation on peudo-noise code acquisition performance in direct sequence spread spectrum systems", Chinese Space Science and Technology, Dec. 25, 2017, vol. 37 No. 6 17-23. the whole document. 7 pages with English abstract.

Qian Zhihong et al., "Review on strategic technology of dense connection for the future mobile network, Journal on Communications", vol. 42 No.4, Apr. 2021. the whole document. 22 pages with English abstract.

* cited by examiner

APPARATUS AND METHOD FOR WIRELESS COMMUNICATION

CROSS-REFERENCE TO RELATED APPLICATIONS

This application is a U.S. national stage of International Application No. PCT/CN2022/100945 filed on Jun. 24, 2022, which claims priority to Chinese Patent Application No. 202110452250.9, filed on Apr. 26, 2021. The disclosures of the above-referenced applications are hereby incorporated by reference in their entirety.

TECHNICAL FIELD

Embodiments of the present disclosure relate to an apparatus and a method for a wireless communication system.

BACKGROUND

Orthogonal Time Frequency Space (OTFS) implements the multiplexed transmission of Quadrature Amplitude Modulation (QAM) symbols through resource allocation mapped onto delay-Doppler domain. The OTFS technology can be applied to multi-user uplink access system, that is, a communication system with multiple transmitting terminals and one receiving terminal. At present, in OTFS system, the receiving terminal mainly adopts Linear Minimum Mean Square Error (LMMSE) equalizer for the receiving signal in time-frequency domain to perform receive equalization on the receiving signal and then performs signal detection in delay-Doppler domain. LMMSE equalizer can only be used for channel equalization in time-frequency domain, but cannot be used to eliminate inter-user interference caused by delay spread and Doppler spread among different transmitting terminals in OTFS system.

SUMMARY

A brief overview of the disclosure is given hereinafter to provide a basic understanding of certain aspects of the disclosure. It should be appreciated that this overview is not an exhaustive overview of the present disclosure, and not intended to define a critical or essential part of the disclosure or to limit the scope of the disclosure. Its purpose is merely to provide certain concepts in a simplified form as a prelude to a more detailed description to be discussed later.

The inventor discovered through research that: iterative serial de-interference decoding can be used for eliminating inter-user interference at the receiving terminal of OTFS multi-user system. For OTFS multi-user system where Doppler spread and delay spread exist at the same time and multi-user multiplexing exists in the Doppler dimension and the delay dimension, iterative serial de-interference decoding can be performed for one of the Doppler dimension and the delay dimension first, and then the decoding result can be used for iterative serial de-interference decoding in another dimension, so as to eliminate inter-user interference in the Doppler dimension and the delay dimension, and improve the reliability of system transmission.

According to one aspect of the present disclosure, the present disclosure provides an apparatus for wireless communication, the apparatus includes a receiving unit and a processing unit.

The receiving unit is configured to receive a first OTFS symbol, the first OTFS symbol is multiplexed by a plurality of transmitting terminals: a plurality of delay-Doppler regions of the first OTFS symbol carries modulated symbols and pilot signals of the plurality of transmitting terminals, respectively: the plurality of delay-Doppler regions one-to-one correspond to the plurality of transmitting terminals: there is no overlap among the plurality of delay-Doppler regions: and there exist delay shift intervals corresponding to different transmitting terminals in a delay dimension and Doppler shift intervals corresponding to different transmitting terminals in a Doppler dimension.

The processing unit is configured to perform the following operations.

A1: the plurality of delay-Doppler regions are divided into a plurality of first-class sets according to different shift intervals occupied in a first dimension, and iterative serial de-interference decoding is performed on a plurality of delay-Doppler regions in a same first-class set of the first-class sets.

A2: the plurality of delay-Doppler regions are divided into a plurality of second-class sets according to different shift intervals occupied in a second dimension, and iterative serial de-interference decoding is performed on a plurality of delay-Doppler regions in a same second-class set of the second-class sets.

The first dimension is one of the delay dimension and the Doppler dimension, and the second dimension is another one, different from the first dimension, of the delay dimension and the Doppler dimension.

According to another aspect of the present disclosure, a wireless communication method is provided, the wireless communication method includes that: a receiving terminal receives a first OTFS symbol: the first OTFS symbol is multiplexed by a plurality of transmitting terminals, a plurality of delay-Doppler regions of the first OTFS symbol carries modulated symbols and pilot signals of the plurality of transmitting terminals, respectively: the plurality of delay-Doppler regions one-to-one correspond to the plurality of transmitting terminals, there is no overlap among the plurality of delay-Doppler regions: and there exist delay shift intervals corresponding to different transmitting terminals in a delay dimension and Doppler shift intervals corresponding to different transmitting terminals in a Doppler dimension; and The receiving terminal performs the following operations:

A1: the plurality of delay-Doppler regions are divided into a plurality of first-class sets according to different shift intervals occupied in a first dimension, and iterative serial de-interference decoding is performed on a plurality of delay-Doppler regions in a same first-class set of the first-class sets:

A2: the plurality of delay-Doppler regions are divided into a plurality of second-class sets according to different shift intervals occupied in a second dimension, and iterative serial de-interference decoding is performed on a plurality of delay-Doppler regions in a same second-class set of the second-class sets.

The first dimension is one of the delay dimension and the Doppler dimension, and the second dimension is another one, different from the first dimension, of the delay dimension and the Doppler dimension.

According to other aspects of the present disclosure, a computer program code and a computer program product for implementing the above-mentioned wireless communication method and a computer readable storage medium having stored thereon the computer program code for implementing the above-mentioned wireless communication method for base station side and user equipment side are also provided.

According to the apparatus and the method for wireless communication of the present disclosure, a receiving terminal for multi-user reception in a multi-user OTFS system can sequentially perform channel estimation and decoding by using an iterative de-interference manner in both of the Doppler dimension and the delay dimension, thereby achieving at least one of the following effects: inter-user interference in an OTFS multi-user system where Doppler spread and delay spread are exist at the same time can be eliminated by using this de-interference manner: the complexity of de-interference operation is reduced; and the reliability of system transmission is improved.

The above and other advantages of the present disclosure will become more apparent from the following detailed description of preferred embodiments of the disclosure in conjunction with the accompanying drawings.

BRIEF DESCRIPTION OF THE DRAWINGS

In order to further illustrate the above and other advantages and features of the present disclosure, a further detailed description of specific implementations of the disclosure is given below with reference to the accompanying drawings. The drawings together with the detailed description below are contained in this specification and form part of the specification. Elements with the same function and structure are represented by the same reference number. It should be appreciated that these drawings describe only typical examples of the disclosure and should not be taken as limiting the scope of the disclosure. In the drawings.

DETAILED DESCRIPTION

Figure 1:
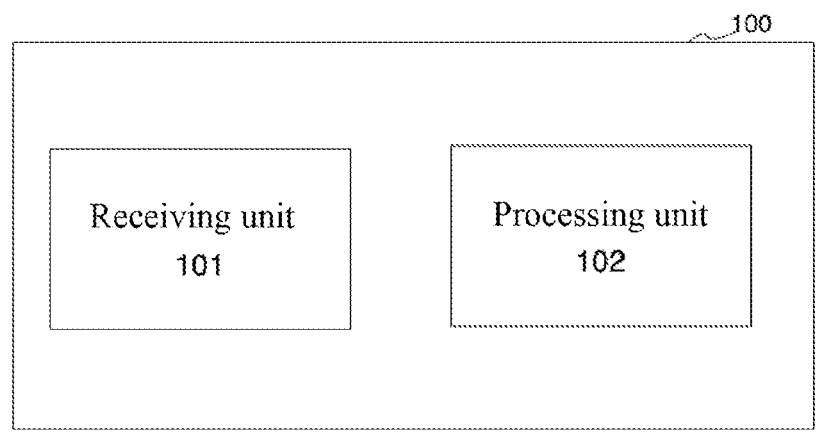
FIG. 1 is a structural block diagram of an apparatus for wireless communication according to an embodiment of the present disclosure.

Exemplary embodiments of the present disclosure will be described below in conjunction with the accompanying drawings. For the sake of clarity and conciseness, all features of actual implementations are not described in this description. However, it should be appreciated that many implementation-specific decisions must be made during the development of any such practical embodiment so as to achieve specific goals of the developer, such as meeting system and business-related limitations, and that these limitations may change with different implementations. Further it should be appreciated that although development work can be very complex and time consuming, such development work is merely a routine task for those skilled in the art benefiting from the present disclosure.

Here, it should also be noted that, in order to avoid obscuring the disclosure by unnecessary details, only the device structure and/or processing steps closely related to the solution according to the disclosure are shown in the drawings, and other details not related to the disclosure are omitted.

First Embodiment

Embodiments of the present disclosure can be applied to multi-user systems in various communication systems such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR), and evolution system of NR system, LTE-based access to unlicensed spectrum (LTE-U) system, NR-based access to unlicensed spectrum (NR-U) system, Universal Mobile Telecommunications System (UMTS), Wireless Local Area Network (WLAN), Wireless Fidelity (WiFi), next generation communication system or other communication system, etc.

Embodiments of the present disclosure do not limit the applied spectrum. For example, embodiments of the present disclosure may be applied to licensed spectrum, may also be applied to unlicensed spectrum.

FIG. 1 is a block diagram illustrating a structure of an apparatus 100 for wireless communication according to an embodiment of the present disclosure, the apparatus 100 includes a receiving unit 101 and a processing unit 102.

The receiving unit 101 is configured to receive first OTFS symbol, the first OTFS symbol is multiplexed by multiple transmitting terminals; multiple delay-Doppler regions of the first OTFS symbol carries modulated symbols and pilot signals of the multiple transmitting terminals, respectively; the multiple delay-Doppler regions one-to-one correspond to the multiple transmitting terminals; there is no overlap among the multiple delay-Doppler regions; and there exist delay shift intervals corresponding to different transmitting terminals in a delay dimension and Doppler shift intervals corresponding to different transmitting terminals in a Doppler dimension.

The processing unit 102 is configured to perform the following operations.

A1: the multiple delay-Doppler regions are divided into multiple first-class sets according to different shift intervals occupied in a first dimension, and iterative serial de-interference decoding is performed on multiple delay-Doppler regions in a same first-class set of the first-class sets.

A2: the multiple delay-Doppler regions are divided into multiple second-class sets according to different shift intervals occupied in a second dimension, and iterative serial de-interference decoding is performed on multiple delay-Doppler regions in a same second-class set of the second-class sets.

The wireless communication system in which the apparatus 100 is located adopts a multi-user OTFS modulation technique. In an Orthogonal Frequency Division Multiplexing (OFDM) system, Phase Shift Key (PSK) or QAM symbols through constellation modulation are placed in grids in the time-frequency domain. In 3GPP 5G Physical Layer Protocol, each grid is a Resource Element (RE), which corresponds to a set of two-dimensional time-frequency domain shift coordinates. In OTFS system, PSK or QAM symbols are placed in grids in the delay-Doppler domain. Each grid in the delay-Doppler domain corresponds to a set of two-dimensional delay-Doppler domain shift coordinates. An OTFS symbol includes $N_t N_f$ two-dimensional delay-Doppler domain grids composed of $N_t$ consecutive Doppler shifts and $N_f$ consecutive delay shifts. After Sympletic Fourier Transform (SFT), the modulation symbols on each delay-Doppler domain grid in an OTFS symbol are spread to the time-frequency domain resource (which is composed of $N_f$ subcarriers and $N_t$ OFDM symbols) corresponding to the OTFS symbol, thereby obtaining more time-frequency diversity gain compared with the OFDM system. In a multi-user OTFS system, an OTFS symbol is multiplexed by multiple transmitting terminals, and different transmitting terminals occupy different delay-Doppler domains within the OTFS symbol to transmit information. In a multi-user OTFS system, even if multiple transmitting terminals occupy the non-overlapping delay-Doppler domain in the same OTFS symbol, there will also exist inter-user interference caused by Doppler spread and delay spread. A more advanced receiver for eliminating inter-user interference in multi-user OTFS systems is needed to solve this problem.

The apparatus 100 may be implemented as a base station in present embodiment and the following embodiments. The base station may include: a main body (also referred to as a base station module) configured to control wireless communication; and one or more remote radio heads (RRH) disposed at a different location from the main body. In addition, various types of terminal devices can operate as base stations by temporarily or semi-persistently performing the function of the base stations. Additionally, the apparatus 100 may also be implemented as any type of server, such as a tower server, a rack server, and a blade server. The apparatus 100 may be a control module mounted on a server (such as an integrated circuit module including a single wafer and a card or blade inserted into a slot of a blade server). For example, the communication system where the apparatus 100 is located applies C-RAN technology, and the apparatus 100 can be implemented as a server in a core network or a baseband cloud setup. The apparatus 100 processes signals received through antennas or antenna arrays of RRH within management range of the apparatus, the RRH within the management range of the apparatus includes a receiving unit 101, and the server where the apparatus 100 is located includes a processing unit 102. The receiving unit 101 is configured to receive a first OTFS symbol, the first OTFS symbol is multiplexed by multiple transmitting terminals; multiple delay-Doppler regions of the first OTFS symbol carries modulated symbols and pilot signals of the multiple transmitting terminals, respectively; the multiple delay-Doppler regions one-to-one correspond to the multiple transmitting terminals; there is no overlap among the multiple delay-Doppler regions; and there exist delay shift intervals corresponding to different transmitting terminals in a delay dimension and Doppler shift intervals corresponding to different transmitting terminals in a Doppler dimension. The processing unit 102 is configured to perform the following operations: A1: the multiple delay-Doppler regions are divided into multiple first-class sets according to different shift intervals occupied in a first dimension, and iterative serial de-interference decoding is performed on multiple delay-Doppler regions in a same first-class set of the multiple first-class sets; A2: the multiple delay-Doppler regions are divided into multiple second-class sets according to different shift intervals occupied in a second dimension, and iterative serial de-interference decoding is performed on multiple delay-Doppler regions in a same second-class set of the multiple second-class sets. In the following description, mainly using that the apparatus 100 is implemented as a base station as an example for explanation and it is appreciated that the scope of the present disclosure is not limited thereto.

The communication device served by the base station may be implemented as a user equipment, such as a mobile terminal served by the base station (such as a smart phone, a tablet personal computer (PC), a notebook PC, a portable game terminal, a portable/dongle mobile router and a digital camera device) or a vehicle terminal (such as a car navigation device), etc. The user equipment may also be implemented as a terminal performing machine-to-machine (M2M) communication (also referred to as a machine-type communication (MTC) terminal). In addition, the user equipment may be a wireless communication module (such as an integrated circuit module including a single wafer) installed on each of the above terminals.

In addition, in some alternative examples, the communication device served/managed by the base station may be implemented as an infrastructure that requires communication with the base station through a wireless interface and performs channel measurements, such as a relay base station, a small eNB or the like. In the following description, mainly using the user equipment as an example for explanation and it is appreciated that the scope of the present disclosure is not limited thereto.

The processing unit 102 may for example be a central processing unit (CPU), a microprocessor, an integrated circuit module or the like with data processing capability.

Figure 2:
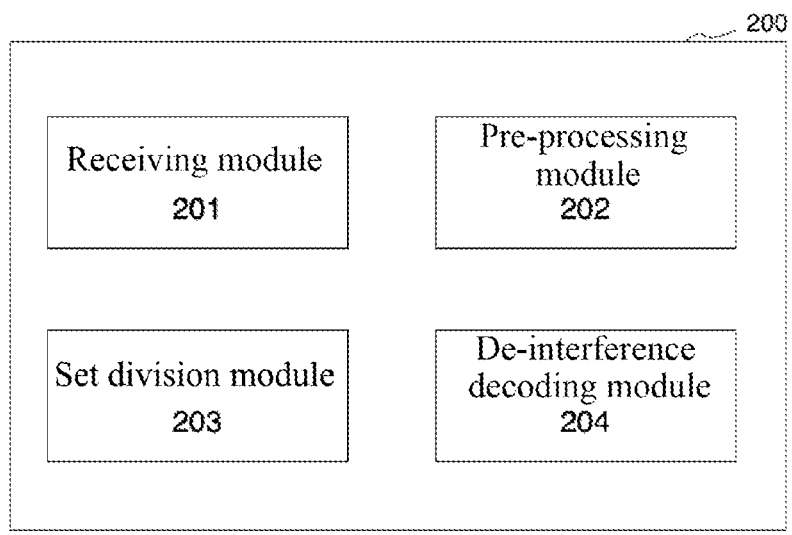
FIG. 2 is a structural block diagram of a specific implementation of an apparatus for wireless communication according to an embodiment of the present disclosure.

Accordingly, FIG. 2 is a structural block diagram showing a specific implementation of the apparatus 100 (identified in FIG. 2 as apparatus 200), and the function and structure of the apparatus 200 will be described in detail below with reference to the block diagram. As shown in FIG. 2, the apparatus 200 includes a receiving module 201, a pre-processing module 202, a set division module 203 and a de-interference decoding module 204. The receiving module 201 is configured to receive a first OTFS symbol, the first OTFS symbol is multiplexed by multiple transmitting terminals; multiple delay-Doppler regions of the first OTFS symbol carries modulated symbols and pilot signals of the multiple transmitting terminals, respectively; the multiple delay-Doppler regions one-to-one correspond to the multiple transmitting terminals; there is no overlap among the multiple delay-Doppler regions; and there exist delay shift intervals corresponding to different transmitting terminals in a delay dimension and Doppler shift intervals corresponding to different transmitting terminals in a Doppler dimension. The pre-processing module 202 is configured to process a received signal into the first OTFS symbol mapped to a delay-Doppler domain. The set division module 203 is configured to divide the multiple delay-Doppler regions into multiple first-class sets according to different shift intervals occupied in a first dimension firstly; and then divide the multiple delay-Doppler regions into multiple second-class sets according to different shift intervals occupied in a second dimension; the first dimension is one of the delay dimension and the Doppler dimension, and the second dimension is another one (different from the first dimension) of the delay dimension and the Doppler dimension. The de-interference decoding module 204 is configured to perform iterative serial de-interference decoding on multiple delay-Doppler regions in a same first-class set of the first-class sets firstly, and then perform iterative serial de-interference decoding on multiple delay-Doppler regions in a same second-class set of the second-class sets.

Alternatively, the set division module 203 is configured to take the delay dimension as the first dimension, and take the Doppler dimension as the second dimension.

Alternatively, the set division module 203 is configured to take the Doppler dimension as the first dimension, and take the delay dimension as the second dimension.

Alternatively, the pre-processing module 202 is configured to convert the received signal represented in the time-frequency domain into the first OTFS symbol represented in the delay-Doppler domain through an Inverse Sympletic Fourier Transform (ISFT).

Alternatively, the pre-processing module 202 is configured to: perform Fast Fourier Transform (FFT) on a sub-frame received in the time domain, to convert into multiple adjacent OFDM symbols represented in the time-frequency domain; and then convert the multiple adjacent OFDM symbols into the first OTFS symbols represented in the delay-Doppler domain through the ISFT.

Alternatively, the de-interference decoding module 204 is configured to: in case that the iterative serial de-interference decoding represents that a first transmitting terminal to be decoded in multiple transmitting terminals in a set is taken as a first transmitting terminal according to a channel decoding sequence of the multiple transmitting terminals in the set, perform the following operations:

B1: channel decoding is performed on the first transmitting terminal according to the first OTFS symbol to obtain a channel decoding result.

B2: whether the channel decoding result passes a check is determined; in response to the channel decoding result passing the check, B3 is performed; and in response to the channel decoding result not passing the check, B5 is performed.

B3: whether there exists a transmitting terminal to be decoded among the multiple transmitting terminals except the first transmitting terminal is determined; in response to the transmitting terminal to be decoded existing, B4 is performed, in response to no transmitting terminal to be decoded existing, it ends.

B4: a signal (which is received from the first transmitting terminal and undergoes a channel) is estimated to obtain a first receiving signal; the first receiving signal in the first OTFS symbol is removed to obtain a second OTFS symbol; a first transmitting terminal to be decoded following the first transmitting terminal is taken as a new first transmitting terminal according to the channel decoding sequence; the second OTFS symbol is taken as a new first OTFS symbol, and B1 is performed.

B5: whether there exists a transmitting terminal to be decoded among the multiple transmitting terminals except the first transmitting terminal is determined; in response to the transmitting terminal to be decoded existing, a first transmitting terminal to be decoded following the first transmitting terminal is taken as a new first transmitting terminal according to the channel decoding sequence, and B1 is performed; in response to no transmitting terminal to be decoded existing, it ends.

Alternatively, the de-interference decoding module 204 is configured to: in case that the first transmitting terminal corresponds to a first delay-Doppler region in the first OTFS symbol, the operation that the channel decoding is performed on the first transmitting terminal according to the first OTFS symbol to obtain the channel decoding result includes that: the channel estimation is performed according to a pilot signal on the first delay-Doppler region to obtain a channel estimation result; a second delay-Doppler region after the first delay-Doppler region is spread and shifted is determined according to the channel estimation result; the first transmitting terminal is demodulated in the second delay-Doppler region to obtain a demodulation result; and the channel decoding is performed according to the demodulation result to obtain the channel decoding result.

Alternatively, the de-interference decoding module 204 is configured to use the processing result of the operation A1 for the processing in the operation A2.

Alternatively, the de-interference decoding module 204 is configured to: use at least one of the modulation symbol, the pilot signal or the channel estimation corresponding to the pilot signal (which are transmitted by the transmitting terminal and are successfully decoded in the operation A1) to generate an interference estimation; and perform an iterative serial de-interference decoding process in operation A2 based on a OTFS symbol from which the interference estimation is removed being taken as a new first OTFS symbol.

Alternatively, the receiving terminal can adopt cyclic redundancy check (CRC) to check the channel decoding result.

Alternatively, the set division module 203 is configured such that multiple delay-Doppler regions in one of the first-class sets do not have multi-user multiplexing in the first dimension; and multiple delay-Doppler regions in one of the second-class sets have multi-user multiplexing only in the first dimension.

Embodiments of the present disclosure do not limit the applied spectrum. For example, embodiments of the present disclosure may be applied to licensed spectrum, and may also be applied to unlicensed spectrum.

To sum up, for the uplink multi-user OTFS system where multi-user multiplexing exists in both the delay domain and the Doppler domain, the apparatus 100 and 200 can perform the division of the first-class sets and the second-class sets according to the distribution of delay-Doppler resource occupied by each user within an OTFS symbol in the delay-Doppler domain. Iterative serial de-interference decoding processing is performed on a received signal in a same set, and the check results for one class set are used as predictive information to perform interference prediction and elimination to use for iterative serial de-interference decoding processing for another class set, thereby solving the interference problem between users caused by Doppler spread and delay spread in a multi-user OTFS system, and further improving the transmission reliability of the multi-user OTFS system.

Second Embodiment

Figure 3:
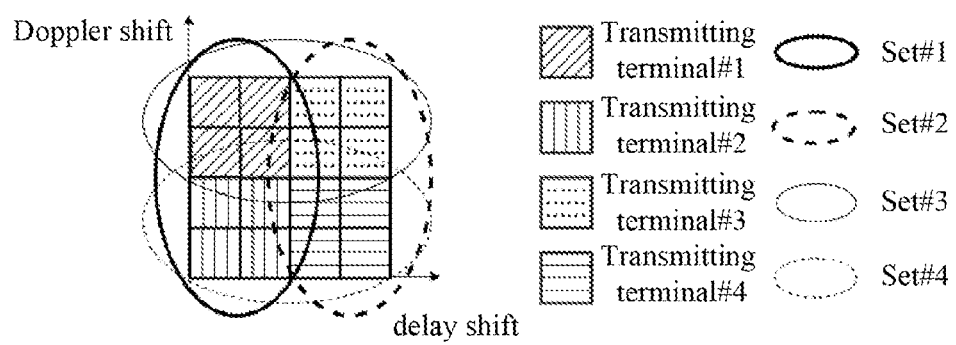
FIG. 3 is a schematic diagram of a set division according to an embodiment of the present disclosure.

FIG. 3 is a schematic diagram of a set division provided according to an embodiment of the present disclosure. In this embodiment, as shown in FIG. 3, an OTFS symbol includes four delay shifts in the delay dimension and four Doppler shifts in the Doppler dimension. The squares filled with oblique lines are the delay-Doppler region #1 occupied by the transmitting terminal #1 on the OTFS symbol, the squares filled with vertical lines are the delay-Doppler region #2 occupied by the transmitting terminal #2 on the OTFS symbol, the squares filled with dots are the delay-Doppler region #3 occupied by the transmitting terminal #3 on the OTFS symbol, and the squares filled with horizontal lines are the delay-Doppler region #4 occupied by the transmitting terminal #4 on the OTFS symbol. The set #1 indicated by thick lines includes the delay-Doppler Region #1 occupied by the transmitting terminal #1 and the delay-Doppler region #2 occupied by the transmitting terminal #2, the set #2 indicated by thick dashed lines includes the delay-Doppler Region #3 occupied by the transmitting terminal #3 and the delay-Doppler region #4 occupied by the transmitting terminal #4, the set #3 indicated by thin solid lines includes the delay-Doppler Region #1 occupied by the transmitting terminal #1 and the delay-Doppler region #3 occupied by the transmitting terminal #3, and the set #4 indicated by thin dashed lines includes the delay-Doppler Region #2 occupied by the transmitting terminal #2 and the delay-Doppler region #4 occupied by the transmitting terminal #4.

The set #1 and the set #2 are two sets divided according to different shift intervals occupied in the delay dimension. The set #3 and the set #4 are two sets divided according to different shift intervals occupied in the Doppler dimension. The set #1 and the set #2 are sets of the same class, while the set #3 and the set #4 are another sets of the same class.

Exemplarily, the set #1 and the set #2 are the first-class sets, while the set #3 and the set #4 are the second-class sets. The receiving terminal firstly performs iterative serial de-interference decoding for the delay-Doppler region in the set #1 and the delay-Doppler region in the set #2, respectively, and then performs iterative serial de-interference decoding for the delay-Doppler region in the set #3 and the delay-Doppler region in the set #4, respectively, and generates interference estimation according to the previous decoding results of the set #1 and the set #2 to perform de-interference processing.

For example, the receiving terminal performs the following operations and obtains the following results.

D1: Iterative serial de-interference decoding is performed for the delay-Doppler Region #1 and the delay-Doppler Region #2 of the set #1. The channel estimation for the channel of the transmitting terminal #1 is performed based on the pilot signal of the transmitting terminal #1. The demodulation and the channel decoding is performed for the data of the transmitting terminal #1 based on the channel estimation result. In response to the decoded data of the transmitting terminal #1 passing the CRC check, the check is succeeded. The interference estimation of the transmitting terminal #1 to the delay-Doppler Region #2 is generated based on the demodulation symbol of the transmitting terminal #1 and the channel estimation and then is removed, then the channel estimation is performed for the channel of the transmitting terminal #2 based on the pilot signal of the transmitting terminal #2; and the demodulation and the channel decoding is performed for the data of the transmitting terminal #2 based on the channel estimation result. In response to the decoded data of the transmitting terminal #2 not passing the CRC check, the check is failed.

D2: Iterative serial de-interference decoding is performed for the delay-Doppler Region #3 and the delay-Doppler Region #4 of the set #2. The channel estimation for the channel of the transmitting terminal #3 is performed based on the pilot signal of the transmitting terminal #3. The demodulation and the channel decoding is performed for the data of the transmitting terminal #3 based on the channel estimation result. In response to the decoded data of the transmitting terminal #3 not passing the CRC check, the check is failed. Then the channel estimation is performed for the channel of the transmitting terminal #4 based on the pilot signal of the transmitting terminal #4. The demodulation and the channel decoding is performed for the data of the transmitting terminal #4 based on the channel estimation result. In response to the decoded data of the transmitting terminal #4 passing the CRC check, the check is succeeded.

D3: Iterative serial de-interference decoding is performed for the delay-Doppler Region #1 and the delay-Doppler Region #3 of the set #3. The interference estimation of the transmitting terminal #1 to the delay-Doppler Region #3 is generated based on the demodulation symbol of the transmitting terminal #1 successfully decoded in the operation D1 and the channel estimation, and then is removed. The demodulation and the channel decoding is performed for the data of the transmitting terminal #3 based on the channel estimation result for the transmitting terminal #3 obtained in the operation D2. In response to the decoded data of the transmitting terminal #3 passing the CRC check, the check is succeeded.

D4: Iterative serial de-interference decoding is performed for the delay-Doppler Region #2 and the delay-Doppler Region #4 of the set #4. The interference estimation of the transmitting terminal #2 to the delay-Doppler Region #2 is generated based on the demodulation symbol of the transmitting terminal #4 successfully decoded in the operation D2 and the channel estimation, and then is removed. The demodulation and the channel decoding is performed for the data of the transmitting terminal #2 based on the channel estimation result for the transmitting terminal #2 obtained in the operation D1. In response to the decoded data of the transmitting terminal #2 passing the CRC check, the check is succeeded. So far, all the data of four transmitting terminals are successfully decoded.

Exemplarily, the set #3 and the set #4 are the first-class sets, while the set #1 and the set #2 are the second-class sets. The receiving terminal firstly performs iterative serial de-interference decoding for the delay-Doppler region in the set #3 and the delay-Doppler region in the set #4, respectively, and then performs iterative serial de-interference decoding for the delay-Doppler region in the set #1 and the delay-Doppler region in the set #2, respectively, and generates interference estimation according to the previous decoding results of the set #3 and the set #4 to perform de-interference processing.

Third Embodiment

In the process of describing the apparatus for wireless communication in the above embodiments, it is apparent that some processes or methods are also disclosed. Hereinafter, a summary of these methods is given without repeating some of the details already discussed above, but it should be noted that although these methods are disclosed in the process of describing the apparatus for wireless communication, these methods may not necessarily employ the components described or be performed by those components. For example, implementations of the apparatus for wireless communication may be implemented partially or entirely using hardware and/or firmware, while the methods for wireless communication discussed below may be implemented entirely by computer executable programs, although these methods may also employ hardware and/or firmware of the apparatus for wireless communication.

Figure 4:
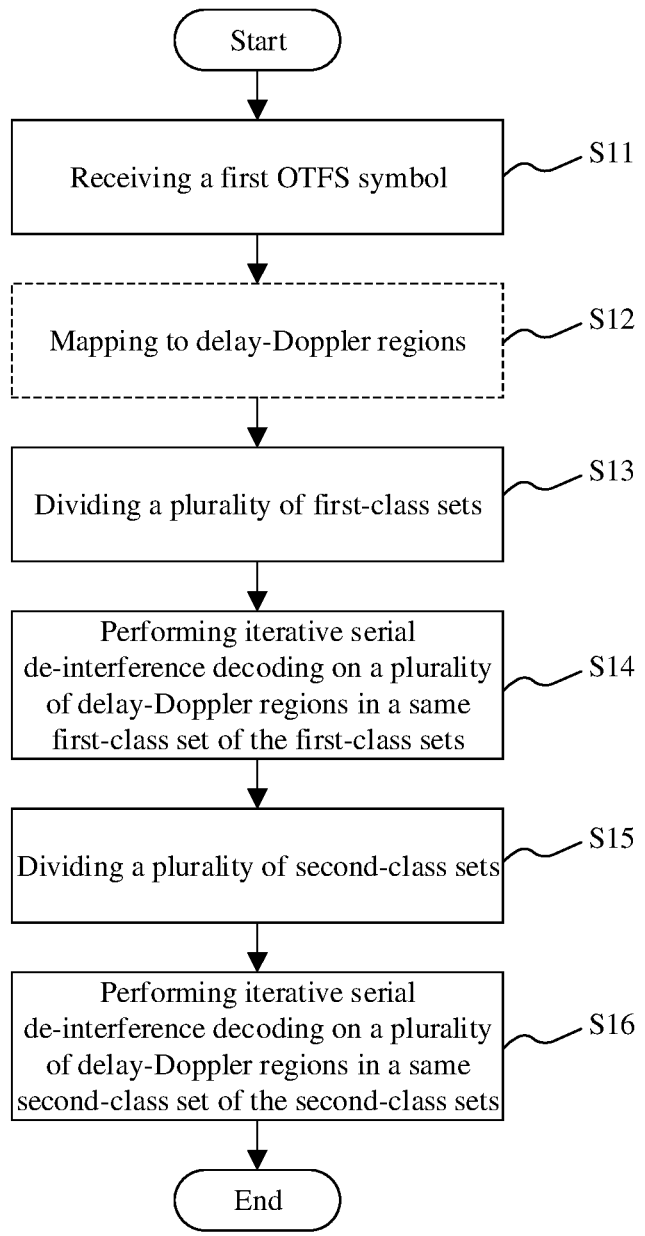
FIG. 4 is a flowchart of a method for wireless communication according to an embodiment of the present disclosure.

FIG. 4 illustrates a flowchart of a method for wireless communication according to an embodiment of the present disclosure, the method includes that: a receiving terminal receives a first OTFS symbol (S11): the first OTFS symbol is multiplexed by multiple transmitting terminals, multiple delay-Doppler regions of the first OTFS symbol carries modulated symbols and pilot signals of the multiple transmitting terminals, respectively: the multiple delay-Doppler regions one-to-one correspond to the multiple transmitting terminals, there is no overlap among the multiple delay-Doppler regions: and there exist delay shift intervals corresponding to different transmitting terminals in a delay dimension and Doppler shift intervals corresponding to different transmitting terminals in a Doppler dimension. The receiving terminal performs the following operations.

A1: the multiple delay-Doppler regions are divided into multiple first-class sets according to different shift intervals occupied in a first dimension (S13), and iterative serial de-interference decoding is performed on multiple delay-Doppler regions in a same first-class set of the first-class sets (S14).

A2: the multiple delay-Doppler regions are divided into multiple second-class sets according to different shift intervals occupied in a second dimension (S15), and iterative serial de-interference decoding is performed on multiple delay-Doppler regions in a same second-class set of the second-class sets (S16).

The first dimension is one of the delay dimension and the Doppler dimension, and the second dimension is another one, different from the first dimension, of the delay dimension and the Doppler dimension.

In operations S13 and S15, the delay dimension may be taken as the first dimension, and the Doppler dimension may be taken as the second dimension.

In operations S13 and S15, the Doppler dimension may be taken as the first dimension, and the delay dimension may be taken as the second dimension.

Exemplary, it also includes that a received signal is processed into the first OTFS symbol mapped to a delay-Doppler domain as shown in the dashed box (S12).

In operations S14 and S16, the iterative serial de-interference decoding represents that a first transmitting terminal to be decoded in multiple transmitting terminals in a set is taken as a first transmitting terminal according to a channel decoding sequence of the multiple transmitting terminals in the set, and the following operations are performed.

B1: channel decoding is performed on the first transmitting terminal according to the first OTFS symbol to obtain a channel decoding result.

B2: whether the channel decoding result passes a check is determined; in response to the channel decoding result passing the check, B3 is performed; and in response to the channel decoding result not passing the check, B5 is performed.

B3: whether there exists a transmitting terminal to be decoded among the multiple transmitting terminals except the first transmitting terminal is determined; in response to the transmitting terminal to be decoded existing, B4 is performed, in response to no transmitting terminal to be decoded existing, it ends.

B4: a signal (which is received from the first transmitting terminal and undergoes a channel) is estimated, to obtain a first receiving signal; the first receiving signal in the first OTFS symbol is removed to obtain a second OTFS symbol; a first transmitting terminal to be decoded following the first transmitting terminal is taken as a new first transmitting terminal according to the channel decoding sequence; the second OTFS symbol is taken as a new first OTFS symbol, and B1 is performed.

B5: whether there exists a transmitting terminal to be decoded among the multiple transmitting terminals except the first transmitting terminal is determined; in response to the transmitting terminal to be decoded existing, a first transmitting terminal to be decoded following the first transmitting terminal is taken as a new first transmitting terminal according to the channel decoding sequence, and B1 is performed; in response to no transmitting terminal to be decoded existing, it ends.

In operations S14 and S16, the first transmitting terminal corresponds to a first delay-Doppler region in the first OTFS symbol, and the operation that the channel decoding is performed on the first transmitting terminal according to the first OTFS symbol to obtain the channel decoding result includes that: the channel estimation is performed according to a pilot signal on the first delay-Doppler region to obtain a channel estimation result; a second delay-Doppler region after the first delay-Doppler region is spread and shifted is determined according to the channel estimation result; the first transmitting terminal is demodulated in the second delay-Doppler region to obtain a demodulation result; and the channel decoding is performed according to the demodulation result to obtain the channel decoding result.

The processing result of the operation S14 may be used for the processing in the operation S16.

At least one of the modulation symbol, the pilot signal or the channel estimation corresponding to the pilot signal (which are transmitted by the transmitting terminal and successfully decoded in the operation S14) may be used to generate interference estimation. Iterative serial de-interference decoding process may be performed in operation S16 based on an OTFS symbol from which the interference estimation is removed being taken as a new first OTFS symbol.

Exemplarily, multiple delay-Doppler regions in one of the first-class sets do not have not multi-user multiplexing in the first dimension; multiple delay-Doppler regions in one of the second-class sets have multi-user multiplexing only in the first dimension.

It is to be noted that the various methods described above may be used in combination or alone, the details of which have been described in detail in the first and second embodiments and will not be repeated here.

Fourth Embodiment

An example of a base station to which the techniques of the present disclosure is applied will be given in this embodiment.

First Application Example

Figure 5:
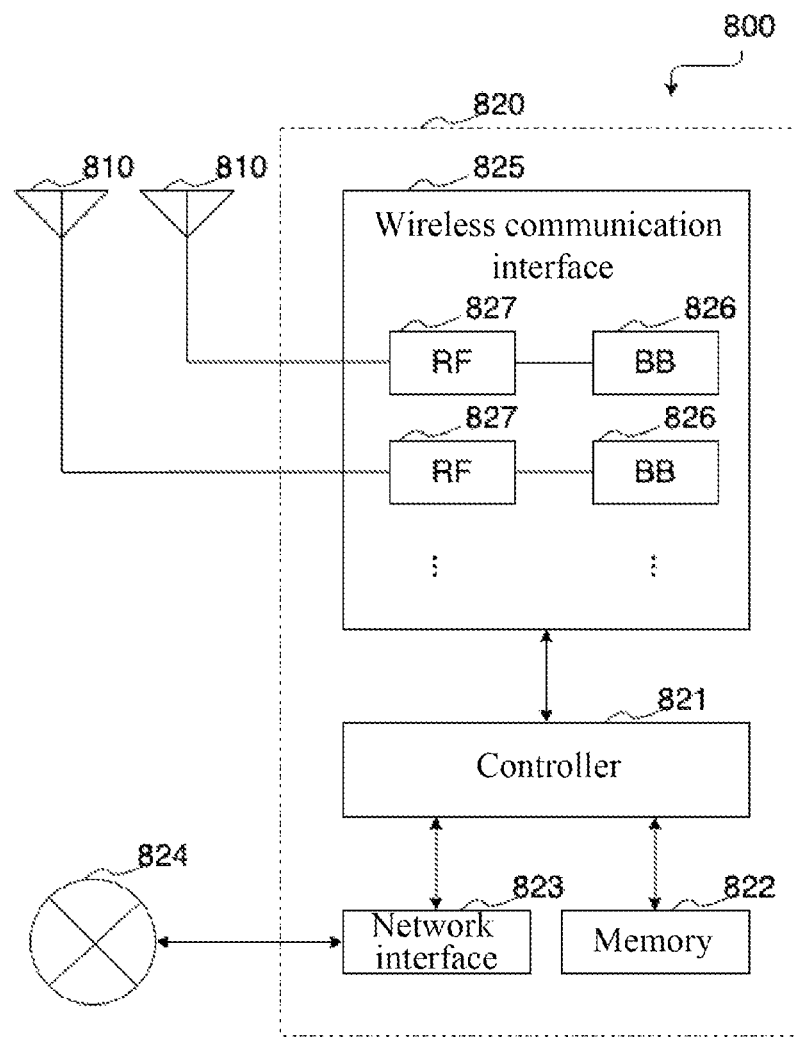
FIG. 5 is a block diagram showing a first example of a schematic configuration of a base station.

FIG. 5 is a block diagram showing a first example of a schematic configuration of a base station to which the techniques of the present disclosure may be applied. The base station 800 includes one or more antennas 810 and a base station module 820. The base station module 820 and each antenna 810 may be linked to each other via an RF cable.

Each of the antennas 810 includes a single or multiple antenna elements (such as multiple antenna elements included in a multiple-input multiple-output (MIMO) antenna) and is used for the base station module 820 to transmit and receive wireless signals. As shown in FIG. 5, the base station 800 includes multiple antennas 810. For example, the multiple antennas 810 may be compatible with multiple frequency bands used by the base station 800. Although FIG. 5 shows an example in which the base station 800 includes the multiple antennas 810, the base station 800 may also include a single antenna 810.

The base station module 820 includes a controller 821, a memory 822, a network interface 823 and a wireless communication interface 825.

The controller 821 may be for example a Central Processing Unit (CPU) or a Digital Signal Processing (DSP) and operates various functions of a higher layer of the base station module 820. For example, the controller 821 generates data packets according to data in signals processed by the wireless communication interface 825 and transfers the generated packets via the network interface 823. The controller 821 may bundle data from multiple baseband processors to generate bundled packet, and transfer the generated bundled packet. The controller 821 may have a logical function to perform controls such as radio resource control, radio bearer control, mobility management, admission control and scheduling. The control can be performed in conjunction with nearby base stations or core network nodes. The memory 822 includes a RAM and a ROM and stores programs executed by the controller 821 and various types of control data (such as a terminal list, transmission power data, and scheduling data).

The network interface 823 is a communication interface for connecting the base station module 820 to the core network 824. The controller 821 may communicate with the core network nodes or additional base stations via the network interface 823. In this case, the base station 800 and the core network node or other base stations may be connected to each other through logical interfaces (such as the SI interface and the X2 interface). The network interface 823 may also be a wired communication interface or a wireless communication interface for a wireless backhaul line. In case the network interface 823 is a wireless communication interface, the network interface 823 may use a higher frequency band for wireless communication as compared to the frequency band used by the wireless communication interface 825.

The wireless communication interface 825 supports any cellular communication scheme (such as Long Term Evolution (LTE), LTE-Advanced and 5G) and provides a wireless connection to the terminals located in a cell of the base station 800 via the antenna 810. The wireless communication interface 825 may generally include, for example, a baseband (BB) processor 826 and RF circuit 827. The BB processor 826 may perform, for example, encoding/decoding, modulation/demodulation, and multiplexing/demultiplexing, and perform various types of signal processing of layers (e.g. L1, Media Access Control (MAC), Radio Link Control (RLC), and Packet Data Convergence Protocol (PDCP)). Instead of the controller 821, the BB processor 826 may have part or all of the logic functions described above. The BB processor 826 may be a memory storing a communication control program or a module including a processor executing the program and the related circuit. The update program may change the function of the BB processor 826. The module may be a card or blade inserted into a slot of the base station module 820. Alternatively, the module may also be a chip mounted on a card or blade. Meanwhile, the RF circuit 827 may include for example mixers, filters and amplifiers, and transmit and receive wireless signals via the antenna 810.

As shown in FIG. 5, the wireless communication interface 825 may include multiple BB processors 826. For example, the multiple BB processors 826 may be compatible with multiple frequency bands used by the base station 800. As shown in FIG. 5, the wireless communication interface 825 may include multiple RF circuits 827. For example, the multiple RF circuits 827 may be compatible with multiple antenna elements. Although FIG. 5 illustrates an example in which the wireless communication interface 826 includes the multiple BB processors 826 and the multiple RF circuits 827, the wireless communication interface 825 may also include a single BB processor 826 or a single RF circuit 827.

Second Application Example

Figure 6:
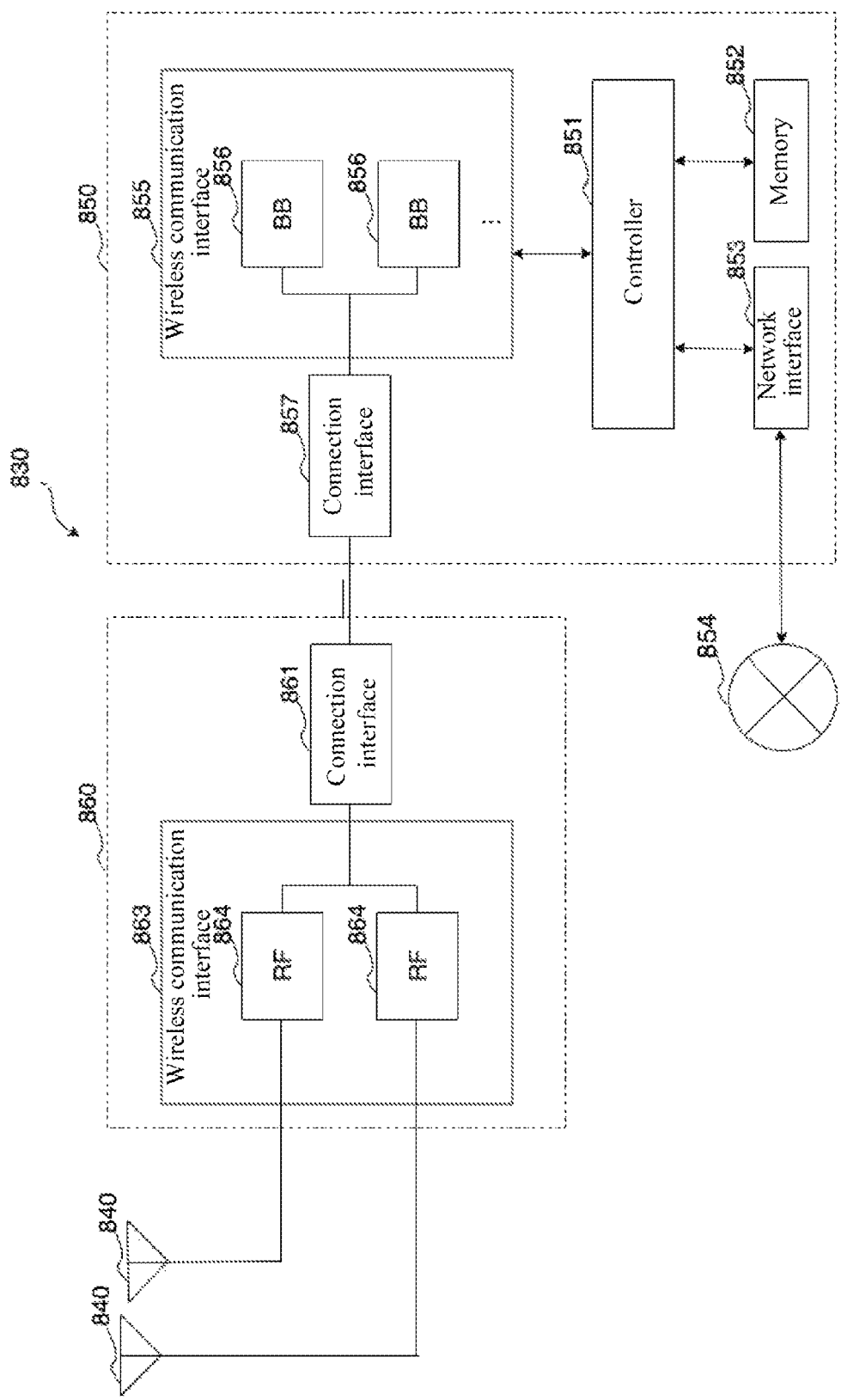
FIG. 6 is a block diagram showing a second example of a schematic configuration of a base station.

FIG. 6 is a block diagram showing a second example of a schematic configuration of a base station to which the techniques of the present disclosure may be applied. The base station 830 includes one or more antennas 840, a base station module 850 and an RRH 860. The RRH 860 and each antenna 840 may be linked to each other via an RF cable. The base station module 850 and the RRH 860 may be connected to each other via a high-speed line such as a fiber optic cable.

Each of the antennas 840 includes a single or multiple antenna elements (such as multiple antenna elements included in a MIMO antenna) and is used for the RRH 860 to transmit and receive wireless signals. As shown in FIG. 6, the base station 830 may include multiple antennas 840. For example, the multiple antennas 840 may be compatible with multiple frequency bands used by the base station 830. Although FIG. 6 shows an example in which the base station 830 includes the multiple antennas 840, the base station 830 may also include a single antenna 840.

The base station module 850 includes a controller 851, a memory 852, a network interface 853, a wireless communication interface 855 and a connection interface 857. The controller 851, the memory 852 and the network interface 853 are the same as the controller 821, the memory 822 and the network interface 823 described with reference to FIG. 5.

The wireless communication interface 855 supports any cellular communication scheme (such as Long Term Evolution (LTE), LTE-Advanced and 5G) and provides wireless communication to the terminals located in sectors corresponding to the RRH 860 via the RRH 860 and the antenna 840. The wireless communication interface 855 may generally include, for example, a BB processor 856. The BB processor 856 is the same as the BB processor 826 described with reference to FIG. 5, except that the BB processor 856 is connected to an RF circuit 864 of the RRH 860 via the connection interface 857. As shown in FIG. 6, the wireless communication interface 855 may include multiple BB processors 856. For example, the multiple BB processors 856 may be compatible with multiple frequency bands used by the base station 830. Although FIG. 6 illustrates an example in which the wireless communication interface 855 includes the multiple BB processors 856, the wireless communication interface 855 may also include a single BB processor 856.

The connection interface 857 is an interface for connecting the base station module 850 (the wireless communication interface 855) to the RRH 860. The connection interface 857 may also be a communication module for connecting the base station module 850 (the wireless communication interface 855) to communication in the above-described high-speed line of the RRH 860.

The RRH 860 includes a connection interface 861 and a wireless communication interface 863.

The connection interface 861 is an interface for connecting the RRH 860 (the wireless communication interface 863) to the base station module 850. The connection interface 861 may also be a communication module for communication in the above-mentioned high-speed line.

The wireless communication interface 863 transmits and receives wireless signals via the antenna 840. The wireless communication interface 863 may generally include, for example, the RF circuit 864. The RF circuit 864 may include, for example, mixers, filters and amplifiers, and transmit and receive wireless signals via the antenna 840. As shown in FIG. 6, the wireless communication interface 863 may include multiple RF circuits 864. For example, the multiple RF circuits 864 may support multiple antenna elements. Although FIG. 6 illustrates an example in which the wireless communication interface 863 includes the multiple RF circuits 864, the wireless communication interface 863 may also include a single RF circuit 864.

In the base station 800 shown in FIG. 5 and the base station 830 shown in FIG. 6, the receiving unit 101 described in FIG. 1 and the receiving module 201 described in FIG. 2 for example may be implemented by the wireless communication interface 825 and the wireless communication interface 855 and/or the wireless communication interface 863. At least a portion of the functions may also be implemented by the controller 821 and the controller 851. For example, the controller 821 and the controller 851 may perform mapping to the delay-Doppler domain, the dividing the first-class sets and the second-class sets, and the iterative de-interference decoding for multiple delay-Doppler domains in a same set by performing the functions of the pre-processing module 202, the set division module 203 and the de-interference decoding module 204.

Fifth Embodiment

An example of a user equipment to which the techniques of the present disclosure is applied will be given in this embodiment.

First Application Example

Figure 7:
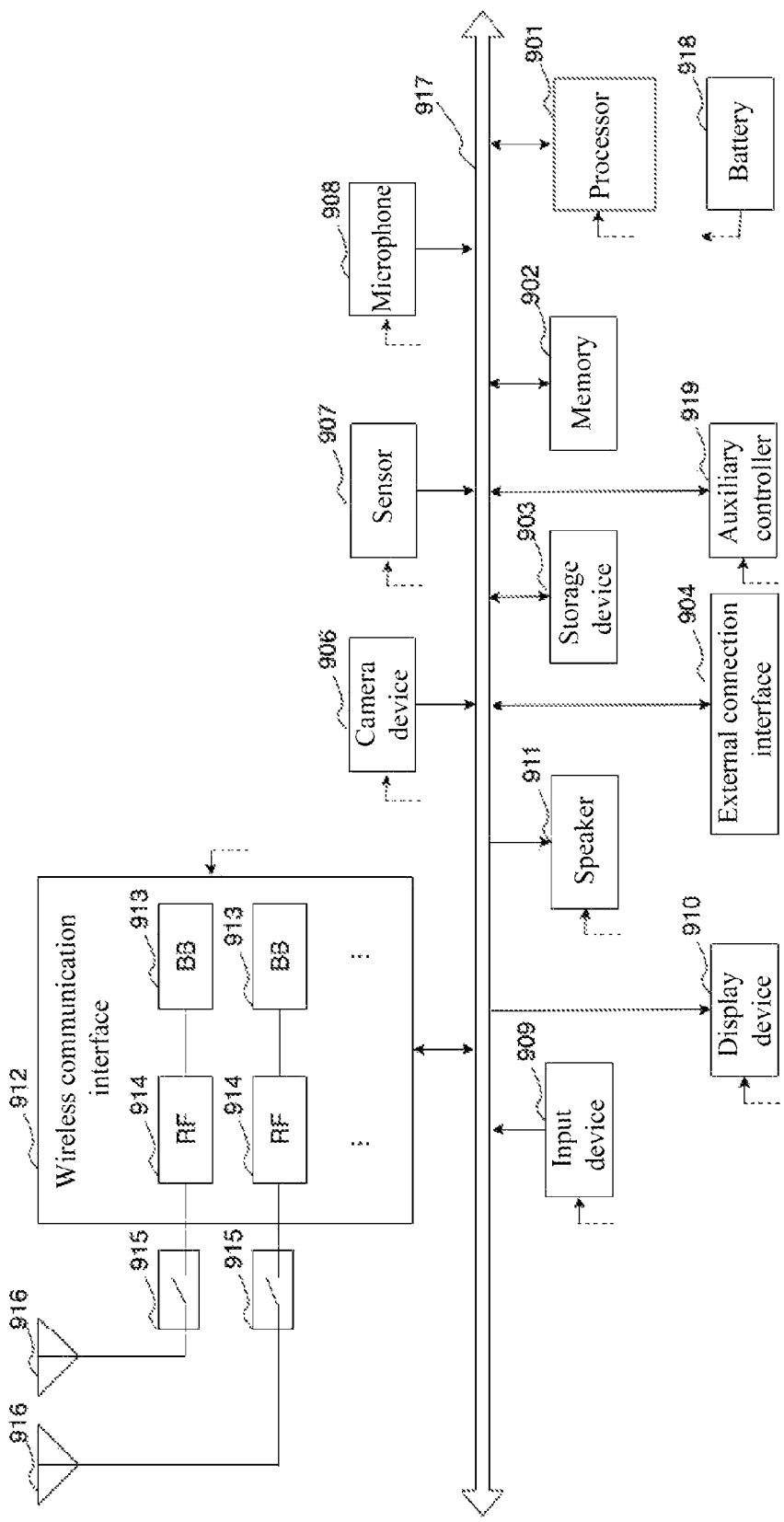
FIG. 7 is a block diagram showing an example of a schematic configuration of a first application example of a user equipment.

FIG. 7 is a block diagram showing an example of a schematic configuration of a smart phone 900 to which the techniques of the present disclosure may be applied. The smart phone 900 includes a processor 901, a memory 902, a storage device 903, an external connection interface 904, a camera device 906, a sensor 907, a microphone 908, an input device 909, a display device 910, a speaker 911, a wireless communication interface 912, one or more antenna switches 915, one or more antennas 916, a bus 917, a battery 918 and an auxiliary controller 919.

The processor 901 may be for example a CPU or a system-on-chip (SoC) and controls the functions of the application layer and other layers of the smart phone 900. The memory 902 includes a RAM and a ROM and stores data and programs executed by the processor 901. The storage device 903 may include a storage medium such as a semiconductor memory and a hard disk. The external connection interface 904 is an interface for connecting an external device (such as a memory card and a universal serial bus (USB) device) to the smart phone 900.

The camera device 906 includes an image sensor (such as a charge coupled device (CCD) and a complementary metal oxide semiconductor (CMOS)) and generates a captured image. The sensor 907 may include a set of sensors such as measurement sensors, gyro sensors, geomagnetic sensors and acceleration sensors. The microphone 908 converts the sound input to the smart phone 900 into an audio signal. The input device 909 includes, for example, a touch sensor configured to detect a touch on a screen of the display device 910, a keypad, a keyboard, a button or a switch, and receives an operation or information input from a user. The display device 910 includes a screen (such as a liquid crystal display (LCD) and an organic light emitting diode (OLED) display) and displays an output image of the smart phone 900. The speaker 911 converts the audio signal output from the smart phone 900 into sound.

The wireless communication interface 912 supports any cellular communication scheme (such as LTE, LTE-Advanced and 5G) and performs wireless communication. The wireless communication interface 912 may generally include, for example, a BB processor 913 and an RF circuit 914. The BB Processor 913 may perform, for example, encoding/decoding, modulation/demodulation, and multiplexing/demodulation, and perform various types of signal processing for wireless communication. Meanwhile, the RF circuit 914 may include, for example, mixers, filters and amplifiers, and transmit and receive wireless signals via the antennas 916. The wireless communication interface 912 may be a chip module on which the BB processor 913 and the RF Circuit 914 are integrated. As shown in FIG. 7, the wireless communication interface 912 may include the multiple BB processors 913 and the multiple RF circuits 914. Although FIG. 7 illustrates an example in which the wireless communication interface 912 includes the multiple BB processors 913 and the multiple RF circuits 914, the wireless communication interface 912 may also include a single BB processor 913 or a single RF circuit 914.

In addition, the wireless communication interface 912 may support other types of wireless communication schemes such as short-range wireless communication schemes, near-field communication schemes and wireless local area network (LAN) schemes in addition to cellular communication schemes. In this case, the wireless communication interface 912 may include a BB processor 913 and an RF circuit 914 for each wireless communication scheme.

Each of the antenna switches 915 switches the connection destinations of the antennas 916 between multiple circuits (e.g. circuits for different wireless communication schemes) included in the wireless communication interface 912.

Each of the antennas 916 includes a single or multiple antenna elements (such as multiple antenna elements included in a MIMO antenna) and is used for wireless communication interface 912 to transmit and receive wireless signals. As shown in FIG. 7, the smart phone 900 may include the multiple antennas 916. Although FIG. 7 shows an example in which the smart phone 900 includes the multiple antennas 916, the smart phone 900 may also include a single antenna 916.

In addition, the smart phone 900 may include an antenna 916 for each wireless communication scheme. In this case, the antenna switches 915 may be omitted from the configuration of the smart phone 900.

A bus 917 connects a processor 901, a memory 902, a storage device 903, an external connection interface 904, a camera device 906, a sensor 907, a microphone 908, an input device 909, a display device 910, a speaker 911, a wireless communication interface 912, and an auxiliary controller 919 to each other. The battery 918 supplies power to the individual blocks of the smart phone 900 shown in FIG. 7 via feeder lines which are partially shown as dashed lines in the figure. The auxiliary controller 919 operates the minimum required function of the smart phone 900 for example in a sleep mode.

In the smart phone 900 shown in FIG. 7, the receiving unit 101 described in FIG. 1 and the receiving module 201 described in FIG. 2 for example may be implemented by the wireless communication interface 912. At least a portion of the functions may also be implemented by the processor 901 or the auxiliary controller 919. For example, the processor 901 or the auxiliary controller 919 may perform the mapping to the delay-Doppler domain, the dividing of the first-class sets and the second-class sets, and the iterative de-interference decoding for multiple delay-Doppler domains in a same set by performing the functions of the pre-processing module 202, the set division module 203 and the de-interference decoding module 204.

Second Application Example

Figure 8:
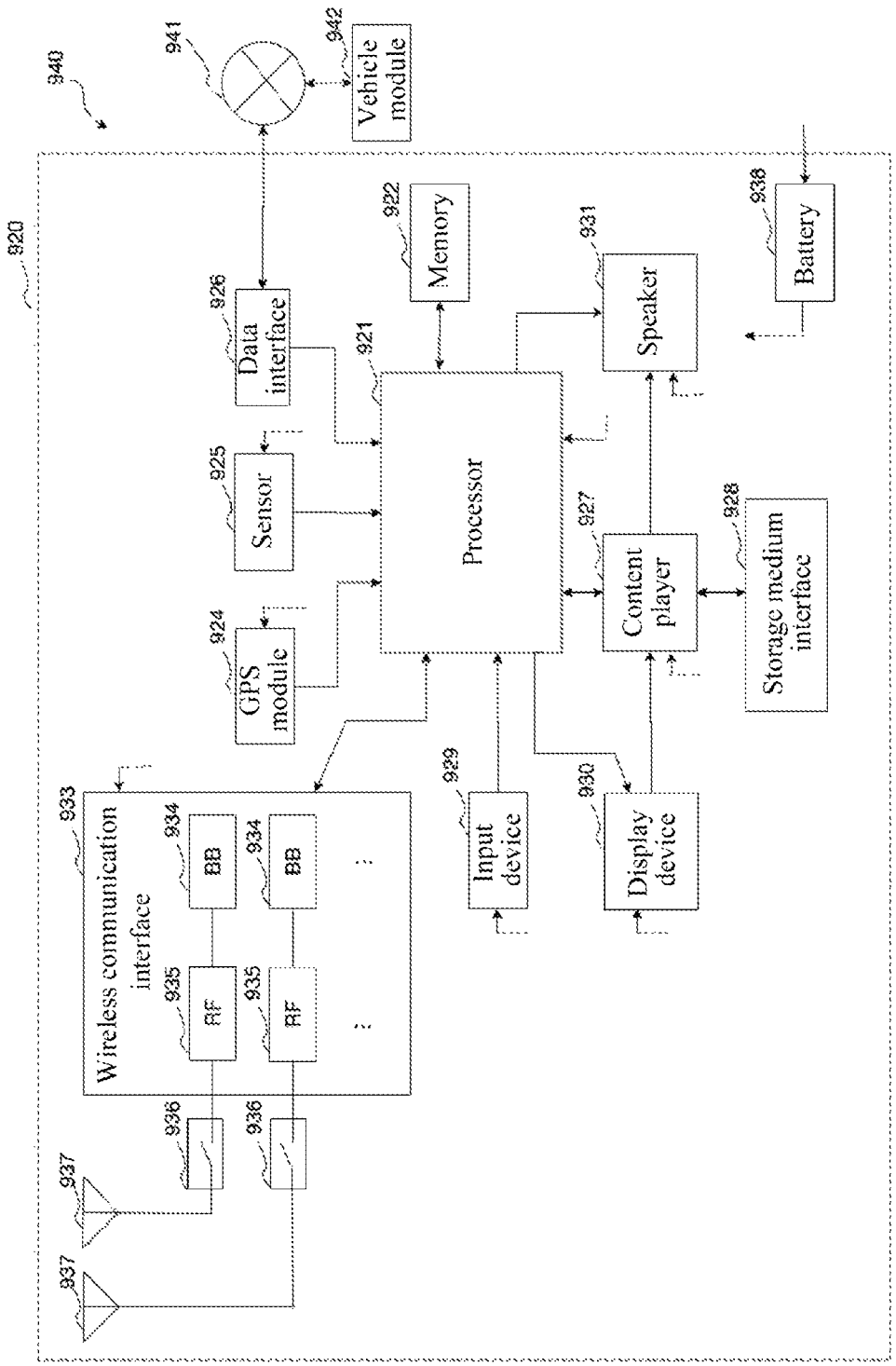
FIG. 8 is a block diagram showing an example of a schematic configuration of a second application example of a user equipment.

FIG. 8 is a block diagram showing an example of a schematic configuration of a car navigation device 920 to which the techniques of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937 and a battery 938.

The processor 921 may be for example a CPU or a system-on-chip (SoC) and controls the navigation functions and the additional functions of the car navigation device 920. The memory 922 includes a RAM and a ROM and stores data and programs executed by the processor 921.

The GPS module 924 uses GPS signals received from GPS satellites to measure the position (such as latitude, longitude and altitude) of the car navigation device 920. The sensor 925 may include a set of sensors such as gyro sensors, geomagnetic sensors and air pressure sensors. The data interface 926 is connected to, for example, the in-vehicle network 941 via a terminal not shown, and acquires data generated by the vehicle (such as vehicle speed data).

The content player 927 reproduces content stored in a storage medium (such as a CD and a DVD) which is inserted into a storage medium interface 928. The input device 929 includes, for example, a touch sensor configured to detect a touch on a screen of the display device 930, a button or a switch, and receives an operation or information input from a user. The display device 930 includes a screen such as an LCD or an OLED display, and displays an image of a navigation function or a reproduced content. The speaker 931 outputs the sound of the navigation function or the reproduced content.

The wireless communication interface 933 supports any cellular communication scheme (such as LTE, LTE-Advanced and 5G) and performs wireless communication. The wireless communication interface 933 may generally include, for example, a BB processor 934 and an RF circuit 935. The BB processor 934 may perform, for example, encoding/decoding, modulation/demodulation, and multiplexing/demultiplexing, and perform various types of signal processing for wireless communication. Meanwhile, the RF circuit 935 may include, for example, mixers, filters and amplifiers, and transmit and receive wireless signals via the antennas 937. The wireless communication interface 933 may be a chip module on which the BB processor 934 and the RF circuit 935 are integrated. As shown in FIG. 8, the wireless communication interface 933 may include the multiple BB processors 934 and the multiple RF circuits 935. Although FIG. 8 illustrates an example in which the wireless communication interface 933 includes the multiple BB processors 934 and the multiple RF circuits 935, the wireless communication interface 933 may also include a single BB processor 934 or a single RF circuit 935.

In addition, the wireless communication interface 933 may support other types of wireless communication schemes such as short-range wireless communication schemes, near-field communication schemes and wireless local area network (LAN) schemes in addition to cellular communication schemes. In this case, the wireless communication interface 933 may include a BB processor 934 and an RF circuit 935 for each wireless communication scheme.

Each of the antenna switches 936 switches the connection destinations of the antennas 937 between multiple circuits (e.g. circuits for different wireless communication schemes) included in the wireless communication interface 933.

Each of the antennas 937 includes a single or multiple antenna elements (such as multiple antenna elements included in a MIMO antenna) and is used for wireless communication interface 933 to transmit and receive wireless signals. As shown in FIG. 8, the car navigation device 920 may include the multiple antennas 937. Although FIG. 8 shows an example in which the car navigation device 920 includes the multiple antennas 937, the car navigation device 920 may also include a single antenna 937.

In addition, the car navigation device 920 may include an antenna 937 for each wireless communication scheme. In this case, the antenna switches 936 may be omitted from the configuration of the car navigation device 920.

The battery 938 supplies power to the individual blocks of the car navigation device 920 shown in FIG. 8 via feeder lines which are partially shown as dashed lines in the figure. The battery 938 accumulates the power provided from the vehicle.

In the car navigation device 920 shown in FIG. 8, the receiving unit 101 described in FIG. 1 and the receiving module 201 described in FIG. 2 for example may be implemented by the wireless communication interface 933. At least a portion of the functions may also be implemented by the processor 921. For example, the processor 921 may perform the mapping to the delay-Doppler domain, the dividing of the first-class sets and the second-class sets, and the iterative de-interference decoding for multiple delay-Doppler domains in a same set by performing the functions of the pre-processing module 202, the set division module 203 and the de-interference decoding module 204.

The techniques of the present disclosure may also be implemented as an in-vehicle system (or vehicle) 940 including a car navigation device 920, an in-vehicle network 941 and one or more blocks in a vehicle module 942. The vehicle module 942 generates vehicle data (such as vehicle speed, engine speed and fault information), and outputs the generated data to the in-vehicle network 941.

The basic principles of the disclosure have been described above in connection with specific embodiments, but it should be noted that for those skilled in the art, all or any operations or components of the method and the apparatus of the present disclosure can be implemented in any computing device (including processors, storage media, etc.) or network of the computing devices in the form of hardware, firmware, software, or a combination thereof, which can be achieved for those skilled in the art by utilizing their basic circuit design knowledge or programming skills after reading the description of the present disclosure.

Furthermore, the disclosure also provides a program product for storing machine-readable instruction code. When the instruction code is read and executed by the machine, the method according to an embodiment of the disclosure described above can be performed.

Accordingly, a program product for storing the above-mentioned machine-readable instruction code is provided. When the instruction code is read and executed by the machine, the method according to an embodiment of the disclosure described above can be performed.

Accordingly, a storage medium for carrying the above-mentioned program product storing machine-readable instruction code is also included in the disclosure of the present disclosure. The storage medium includes, but is not limited to, floppy disks, optical disks, magneto-optical disks, memory cards, memory sticks, and the like.

In the case of implementing the present disclosure through software or firmware, a program constituting the software is installed from a storage medium or a network to a computer (for example, general computer 1900 shown in FIG. 9) with a dedicated hardware structure, and the computer is able to execute various functions and the like in the case of various programs are installed.

Figure 9:
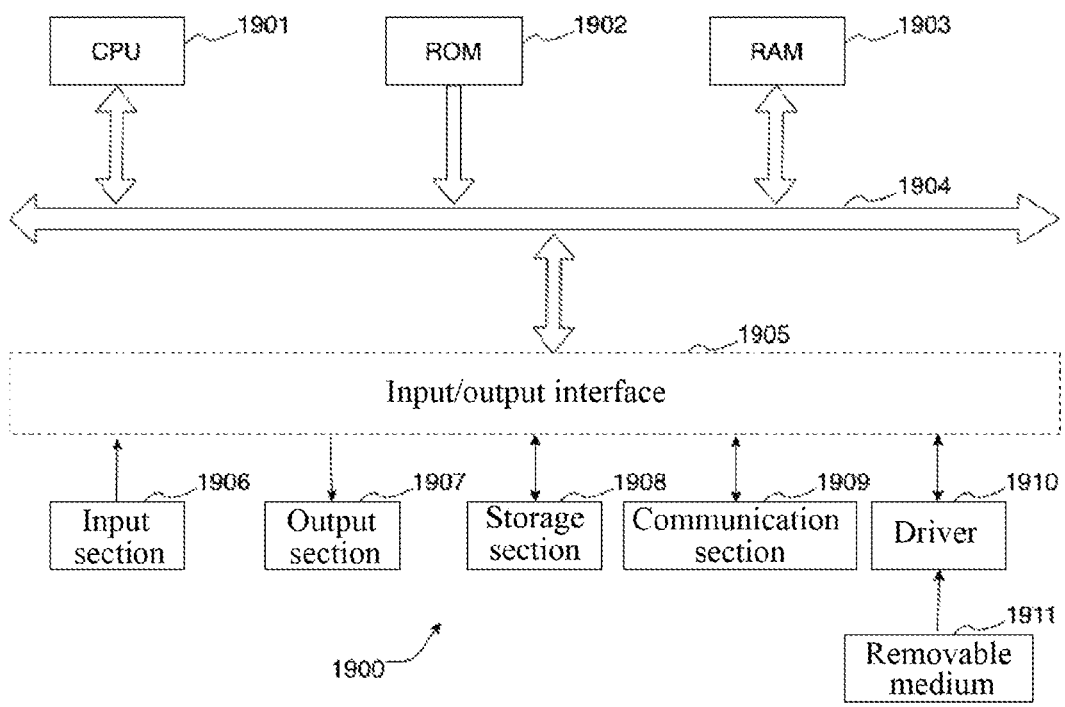
FIG. 9 is a block diagram of an exemplary structure of a general purpose personal computer in which methods and/or apparatuses and/or systems according to embodiments of the present disclosure may be implemented.

In FIG. 9, a central processing unit (CPU) 1901 executes various processes according to a program stored in a read-only memory (ROM) 1902 or a program loaded from a storage section 1908 into a random access memory (RAM) 1903. In the RAM 1903, data required when the CPU 1901 executes various processes and the like are also stored as needed. The CPU 1901, the ROM 1902, and the RAM 1903 are connected to each other via a bus 1904. An input/output interface 1905 is also connected to the bus 1904.

The following components are connected to the input/output interface 1905: an input section 1906 (including a keyboard, a mouse, etc.), an output section 1907 (including a display, such as a cathode ray tube (CRT), a liquid crystal display (LCD), etc., and a speaker, etc.), a storage section 1908 (including a hard disk, etc.), and a communication section 1909 (including a network interface card, such as a LAN card, a modem, etc.). The communication section 1909 performs communication processing via a network such as the Internet. The driver 1910 may also be connected to the input/output interface 1905 as needed. A removable medium 1911 (such as a magnetic disk, an optical disk, a magneto-optical disk, a semiconductor memory or the like) is mounted on the driver 1910 as needed such that a computer program read out therefrom is mounted into the storage section 1908 as needed.

In a case where the above-described series of processes are implemented by software, a program constituting the software is installed from a network such as the Internet or a storage medium (such as a removable medium 1911).

It is appreciated by those skilled in the art that such a storage medium is not limited to the removable medium 1911 shown in FIG. 9 in which a program is stored and distributed separately from the device to provide the program to the user. Examples of the removable medium 1911 include a magnetic disk (including a floppy disk (registered trademark)), an optical disk (including an optical disk read-only memory (CD-ROM)) and a digital versatile disk (DVD), a magneto-optical disk (including a mini disk (MD) (registered trademark)), and a semiconductor memory. Alternatively, the storage medium may be a ROM 1902, a hard disk contained in the storage section 1908 or the like, in which programs are stored and which is distributed to the user together with the device containing them.

It is also to be noted that in the apparatus, the method and the system of the present disclosure, components or operations may be decomposed and/or recombined. These decompositions and/or recombination should be regarded as equivalent solutions of the present disclosure. Furthermore, the operations for executing the above-described series of processes can naturally be performed in chronological order according to the explained order, but it is not necessary to perform in chronological order. Certain operations can be performed in parallel or independently of each other.

Finally, it should be noted that the terms "including", "containing" or any other variation thereof are intended to encompass non-exclusive inclusion, so that a process, a method, an object or an equipment that includes a series of elements includes not only those elements but also other elements that are not explicitly listed or elements that are inherent in the process, the method, the object or the equipment. In addition, in the absence of further limitations, an element defined by the phrase "including an . . . " does not preclude the existence of another identical element in the process, the method, the object or the equipment in which the element is included.

Although embodiments of the disclosure have been described in detail above with reference to the accompanying drawings, it should be understood that the implementations described above are intended to be illustrative of the disclosure only and do not constitute a limitation of the present disclosure. For those skilled in the art, various modifications and changes may be made to the above implementations without departing from the essence and scope of the present disclosure. Therefore, the scope of the disclosure is delimited only by the appended claims and their equivalent meanings.

The invention claimed is:

1. An apparatus for wireless communication, performed by a receiving terminal, comprising:
   wireless communication interface, configured to receive a first Orthogonal Time-Frequency-Space (OTFS) symbol, wherein the first OTFS symbol is multiplexed by a plurality of transmitting terminals; a plurality of delay-Doppler regions of the first OTFS symbol carries modulated symbols and pilot signals of the plurality of transmitting terminals, respectively; the plurality of delay-Doppler regions one-to-one correspond to the plurality of transmitting terminals; there is no overlap among the plurality of delay-Doppler regions; and there exists delay shift intervals corresponding to different transmitting terminals in a delay dimension and Doppler shift intervals corresponding to different transmitting terminals in a Doppler dimension; and
   a processor, configured to perform the following operations:
      A1: dividing the plurality of delay-Doppler regions into a plurality of first-class sets according to different shift intervals occupied in a first dimension, and performing iterative serial de-interference decoding on a plurality of delay-Doppler regions in a same first-class set of the plurality of the first-class sets; and
      A2: dividing the plurality of delay-Doppler regions into a plurality of second-class sets according to different shift intervals occupied in a second dimension, and performing iterative serial de-interference decoding on a plurality of delay-Doppler regions in a same second-class set of the plurality of the second-class sets;
      wherein the first dimension is one of the delay dimension and the Doppler dimension, and the second dimension is another one, different from the first dimension, of the delay dimension and the Doppler dimension.

2. The apparatus of claim 1, wherein the processor is further configured to:
   take the delay dimension as the first dimension, and take the Doppler dimension as the second dimension.

3. The apparatus of claim 1, wherein the processor is further configured to:

take the Doppler dimension as the first dimension, and take the delay dimension as the second dimension.

4. The apparatus of claim 1, wherein the processor is further configured to:
   process a received signal into the first OTFS symbol mapped to a delay-Doppler domain.

5. The apparatus of claim 1, wherein
in case that the iterative serial de-interference decoding represents that a first transmitting terminal to be decoded in a plurality of transmitting terminals in a set is taken as a first transmitting terminal according to a channel decoding sequence of the plurality of transmitting terminals in the set, the processor is further configured to:
   B1: perform channel decoding on the first transmitting terminal according to the first OTFS symbol to obtain a channel decoding result;
   B2: determine whether the channel decoding result passes a check; in response to the channel decoding result passing the check, perform B3; and in response to the channel decoding result not passing the check, perform B5;
   B3: determine whether there exists a transmitting terminal to be decoded among the plurality of transmitting terminals except the first transmitting terminal; in response to the transmitting terminal to be decoded existing, perform B4, in response to no transmitting terminal to be decoded existing, it ends;
   B4: estimate a signal which is received from the first transmitting terminal and undergoes a channel, to obtain a first receiving signal; remove the first receiving signal in the first OTFS symbol to obtain a second OTFS symbol; take a first transmitting terminal to be decoded following the first transmitting terminal as a new first transmitting terminal according to the channel decoding sequence; take the second OTFS symbol as a new first OTFS symbol, and perform B1; and
   B5: determine whether there exists a transmitting terminal to be decoded among the plurality of transmitting terminals except the first transmitting terminal; in response to the transmitting terminal to be decoded existing, take a first transmitting terminal to be decoded following the first transmitting terminal as a new first transmitting terminal according to the channel decoding sequence, and perform B1; in response to no transmitting terminal to be decoded existing, it ends.

6. The apparatus of claim 5, wherein
the first transmitting terminal corresponds to a first delay-Doppler region in the first OTFS symbol, and the processor is further configured to:
   perform a channel estimation according to a pilot signal on the first delay-Doppler region to obtain a channel estimation result;
   determine, according to the channel estimation result, a second delay-Doppler region after the first delay-Doppler region is spread and shifted;
   demodulate the first transmitting terminal in the second delay-Doppler region to obtain a demodulation result; and
   perform channel decoding according to the demodulation result to obtain the channel decoding result.

7. The apparatus of claim 1, wherein the processor is further configured to:
   use the processing result of the operation A1 for the processing in the operation A2.

8. The apparatus of claim 7, wherein the processor is further configured to:
   use at least one of the modulation symbol, the pilot signal or the channel estimation corresponding to the pilot signal, which are transmitted by the transmitting terminal and successfully decoded in the operation A1, to generate an interference estimation; and
   perform an iterative serial de-interference decoding process in operation A2 based on a OTFS symbol from which the interference estimation is removed being taken as a new first OTFS symbol.

9. The apparatus of claim 1, wherein
a plurality of delay-Doppler regions in one of the plurality of the first-class sets do not have multi-user multiplexing in the first dimension; and a plurality of delay-Doppler regions in one of the plurality of the second-class sets have multi-user multiplexing only in the first dimension.

10. A method for wireless communication, comprising:
   receiving, by a receiving terminal, a first Orthogonal Time-Frequency-Space (OTFS) symbol, wherein the first OTFS symbol is multiplexed by a plurality of transmitting terminals; a plurality of delay-Doppler regions of the first OTFS symbol carries modulated symbols and pilot signals of the plurality of transmitting terminals, respectively; the plurality of delay-Doppler regions one-to-one correspond to the plurality of transmitting terminals; there is no overlap among the plurality of delay-Doppler regions; and there exists delay shift intervals corresponding to different transmitting terminals in a delay dimension and Doppler shift intervals corresponding to different transmitting terminals in a Doppler dimension; and
   performing, by the receiving terminal, the following operations:
      A1: dividing the plurality of delay-Doppler regions into a plurality of first-class sets according to different shift intervals occupied in a first dimension, and performing iterative serial de-interference decoding on a plurality of delay-Doppler regions in a same first-class set of the plurality of the first-class sets; and;
      A2: dividing the plurality of delay-Doppler regions into a plurality of second-class sets according to different shift intervals occupied in a second dimension, and performing iterative serial de-interference decoding on a plurality of delay-Doppler regions in a same second-class set of the plurality of the second-class sets;
      wherein the first dimension is one of the delay dimension and the Doppler dimension, and the second dimension is another one, different from the first dimension, of the delay dimension and the Doppler dimension.

* * * * *